United States Patent Office 3,355,140
Patented Nov. 28, 1967

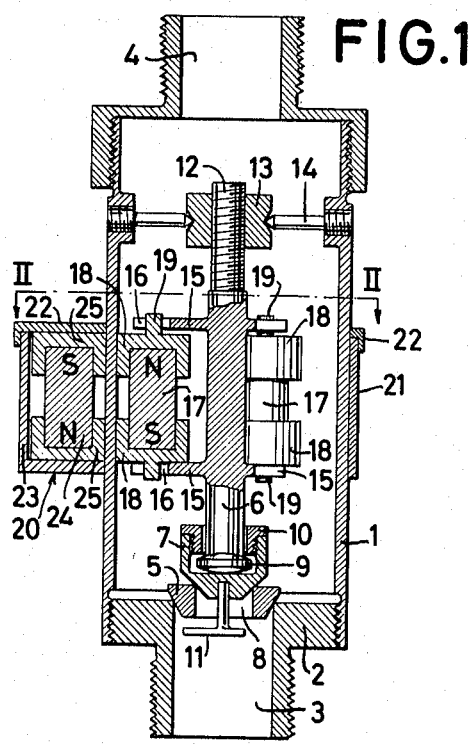
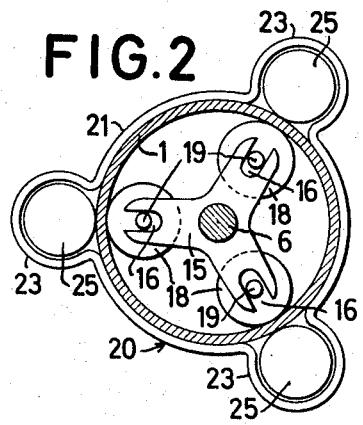
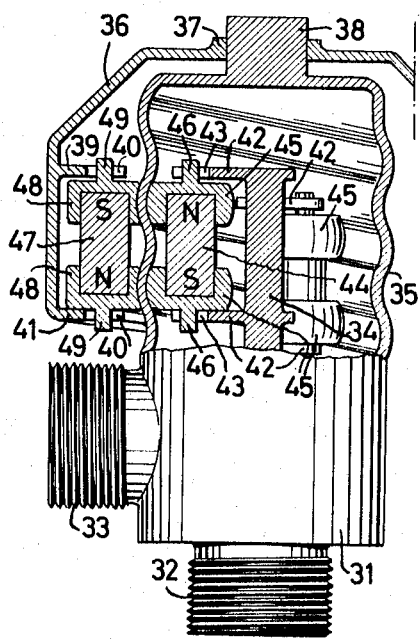

3,355,140
MAGNETICALLY OPERATED FLUID
CONTROL VALVE
Obel F. E. Andersen, Kokkedal, Denmark, assignor to Eric Schaumburg, Holmenkollen, Norway
Filed Sept. 3, 1965, Ser. No. 484,847
Claims priority, application Denmark, Nov. 9, 1964, 4,317/64
10 Claims. (Cl. 251—65)

This invention relates to a fluid control valve comprising a valve body having a flow passage extending therethrough, a valve member displaceable within said valve body for selectively opening and closing said flow passage, an actuating member located within said valve body and operatively connected to said valve member for displacing said member, a displaceable manoeuvring member on the outer side of said valve body, and permanent magnet means supported by said actuating member and said manoeuvring member so as to be located in pairs opposite one another at either side of a wall of said valve body for transmitting movements of said manoeuvring member to said actuating member.

In known fluid control valves of this type wherein the permanent magnet means are rigidly secured to the manoeuvring member and the actuating member, respectively, it has been found that difficulties occur in obtaining a perfect synchronizing between the movements of the manoeuvring member and those of the actuating member, which in particular with the so-called modulating valves, in which the valve member must be capable of being adjusted to any position between the fully open and fully closed positions, is a serious objection.

This invention which inter alia has for its object to overcome this disadvantage, is based on the recognition that the difficulties mentioned can primarily be ascribed to the circumstance that during the displacement of the manoeuvring member, the magnets have to slide on the valve body which results in jerky movement of the actuating member because the movement of this member cannot start until the static friction between the magnets and the wall of the valve body has been overcome, i.e. not until the outer manoeuvring member has moved some distance. This means that it will in particular be difficult to carry out minor adjustments of the valve member position with satisfactory precision. To some extent, the said disadvantage could be obviated by establishing an air gap between the valve body wall and the interior magnets but the additional magnetic resistance introduced thereby would necessitate the use of very powerful magnets and, consequently, raise the volume and the production costs of the valve.

According to the invention, the said disadvantages are overcome by supporting at least the magnets located at the inner side of the valve body so that in response to a displacement of the manoeuvring member they can perform a rolling movement along the wall of the valve body. Due to the reduction, thus obtained, of the frictional resistance against the movement of the magnets it becomes possible to avoid an air gap between the magnets and the wall and, consequently, to reduce the magnetic resistance which again leads to an optimal utilization of the magnetic force at disposal, while at the same time it is possible to obtain exact conformity between an externally produced displacement of the manoeuvring member and the corresponding displacement of the actuating member and, consequently, of the valve member.

If the wall of the valve body is a surface of rotation, the magnets may be rod magnets which are disposed so as to be rotatable on their longitudinal axes in the actuating member. In this connection it will be appreciated that it may often be advantageous that both the internal and the external magnets are rotatably supported, such feature facilitating also the manual performance of a desired adjustment by means of the manoeuvring member.

A preferred embodiment of the invention is characteristic in that the wall of the valve body is provided with a thread of relatively softly rounded profile shape, and that the end portions of the magnets are of a cross-sectional shape adapted to the thread. This replacement of the conventional internal thread which, when the valve member is rotated, causes said member to be displaced axially, by a thread of correspondingly greater diameter provided in the wall of the valve body provides, in combination with the feature that the magnets can roll, a further reduction of the friction and a greater accuracy of adjustment of the valve member.

According to a feature of the invention the magnets may be circular-cylindrical and provided at their ends with pole shoes of a greater diameter whereby an increased magnetic flux between the opposed magnet poles at either side of the valve body wall is obtained.

The rotatable mounting of the magnets may be realised by providing the magnets at each end with an axially projecting pin which is guided in a radial slot in a holder secured to the actuating member and/or the manoeuvring member. This feature may advantageously be applied both to the internal and the external magnets, also in case the latter are not arranged for rolling on the valve body wall, the radial slots in the holder ensuring that the magnets will always be capable of assuming a position wherein their operative faces are in direct engagement with the valve body wall irrespective of minor inaccuracies, if any, in the making thereof.

In order to enable the invention to be carried out, reference will now be made to the accompanying diagrammatical drawing, wherein:

FIG. 1 is a longitudinal section through a first embodiment of the valve according to the invention, FIG. 2 is a section taken on line II—II in FIG. 1, and FIG. 3 is a side-view, partly in scetion, of a modified embodiment of the valve according to the invention.

The valve shown in FIG. 1 comprises a cylindrical tubular valve body 1 which is made of a suitable non-magnetic material, for example non-magnetic stainless steel. An outlet socket 2 defining an axial outlet passage 3, is screwed into one end of the valve body, and an inlet socket 4 is screwed onto the opposite end of the valve body. The edge of the outlet passage 3 facing the interior of the body 1 functions as a valve seat which engages a conical valve member 5 which, in connection with a socket 2 made of steel or other metal, may expediently be made of plastic material.

The lower end of valve spindle 6 that extends axially through the valve body 1, is movably connected with a pilot valve member 7 which engages a pilot seat extending along the circumferential edge of an axial flow passage 8 in the valve member 5. The valve member 7 embraces an enlargement 9 at the end of the valve spindle 6 which enlargement has two ball-shaped axial faces which are located with a small axial play between the valve member 7 and a nut 10 screwed into said member. In this manner, the valve member 7 and the spindle 6 can freely rotate with respect to one another and, moreover, perform a slight axial displacement with respect to one another. To the lower side of the valve member 7 there is secured a valve tappet 11 that extends downwardly through the passage 8, below which the tappet is provided with three radially extending arms which in the closed position of the valve, as shown in FIG. 1, are located slightly below the valve member 5.

The upper end of the valve spindle 6 has an external thread 12 which engages a nut 13 which is held against rotation and axial displacement by means of two or, if desired, more conical bearing pins 14 which are screwed into the wall of the valve body 1, so that the radial position of the nut 13 may be adjusted.

Two longitudinally spaced holders 15 are integral with the valve spindle 6. In the embodiment shown, each holder 15 is constituted by a three-branched spider having three radial slots 16 disposed with equal angular spacing. Three cylindrical rod magnets 17 of a suitable permanently magnetic material are at each end thereof provided with a pole piece or shoe 18, made e.g. of soft iron, which has a circular-cylindrical lateral face and a plane end face provided with a central recess into which one end of the magnet 17 fits tightly. The opposite end face of each pole shoe 18 is provided with a cylindrical pivot pin 19 which is guided with a suitable play in a slot 16 in one of the two holders 15.

At the outer side of the valve body 1 there is provided a manoeuvring member generally designated by 20 and comprising a cup-shaped housing 21 of non-magnetic material and a cover 22. In FIG. 2 the manoeuvring member 20 is shown with the cover 22 removed.

The housing 21 is generally of circular-cylindrical shape with an internal diameter corresponding to the outer diameter of the valve body 1, and further it is provided with three pockets or enlargements 23 located correspondingly to the three magnets 17 disposed inside the valve body 1 and with the same angular interspacing as said magnets. In each pocket 23 of the manoeuvring member 20 there is arranged a circular-cylindrical rod magnet 24, at the ends of which there are secured two circular-cylindrical pole shoes 25 of greater diameter than the magnet 24. The diameter of the pole shoes is chosen so as to permit the latter of rotating freely in the associated pockets 23 and of making small radial adjustments therein. When an internal and an external magnet 17 and 24, respectively, are arranged so that a north pole of one magnet is opposite the south pole of the other, as shown in FIG. 1, the pole shoes 18 and 25, respectively, will attract one another and consequently, owing to the mobility of the magnets in their respective holders, they will enter into engagement with the inner side and the outer side, respectively, of the cylindrical wall of the valve body 1. In response to a manual rotation of the manoeuvring member 20, the magnets 24 will tend to carry along the magnets 17 and, on account of the freedom of the magnets to move and especially the rotatability of the internal magnets 17 in the holders 15, the valve spindle 6 will follow the rotation of the manoeuvring member 20 with great accuracy.

By rotation of the manoeuvring member 20 counter-clockwise as viewed in FIG. 2, the valve spindle 6 will simultaneously, due to the engagement between the thread 12 and the nut 13, be raised from the position shown in FIG. 1 whereby, after having overcome the small axial play between the enlargement 9 and the nut 10, it first raises the pilot valve member 7 so as to establish pressure equalization between the upper and lower sides of the main valve member 5. After a further short travel of the spindle 6, the valve tappet 11 will lift the valve member 5 so that the outlet passage proper extending between the valve member 5 and the socket 2 is opened. It will be appreciated that the pilot valve device shown may be omitted if the valve is only intended for opening against a relatively small pressure difference.

Instead of the circular-cylindrical pole shoes 25 on the external magnets 24 shown in FIGS. 1 and 2, which permit the magnets of rolling on the outer side of the valve body 1, there may in some cases be employed pole shoes which on part of their cylindrical surfaces are profile-ground so as to conform with the outer diameter of the valve body 1 whereby the pole shoes will engage the body along a part of a cylinder face instead of along a line only. By such increase of the outer magnets' contact area, the magnetic losses between the external and the internal magnets may be reduced. When the holders 15 are provided with only two diametrically opposed arms and, correspondingly, two magnets—instead of three as shown in FIGS. 1 and 2—it may be possible to reduce the magnetic losses due to the stray field inside the valve body 1 by arranging the two diametrically opposed magnets 17 so that a north pole of one magent lies in the same normal plane of the valve body as a south pole of the other magnet.

The valve shown in FIG. 3 comprises a generally cylindrical valve body 31 provided with an inlet socket 32 and an outlet socket 33 at one end and at the side, respectively, of the valve body. The valve member proper and the associated valve seat are not shown since these parts may be of quite conventional design or, similarly to that shown in FIG. 1, be provided with a separate pilot valve member. FIG. 3 shows the top end of a valve spindle 34 which is in mechanical connection with a valve member, not shown, so that the latter may open or close the flow passage through the valve body by axial displacement of the valve spindle 34.

Above the lower cylindrical part of the valve body 31 to which the sockets 32 and 33 are connected, the valve body is provided with a thread 35 the profile shape of which is softly rounded substantially like the thread profile of a glass bottle or metal jar.

The axial movement of the valve spindle 34 is produced by manual rotation of a control handle 36 which comprises a cylindrical portion and a conical portion, both coaxial with the valve body 31, and a plane end face portion with an axial bore embracing a projecting guide pin 38 on the valve body 31. In conjunction with the pin 38 and the boss 37 there may be provided a graduated scale and an indicating member showing the position of the interval valve member.

The inner side of cylindrical portion of the control handle 36 is provided with three radially and inwardly extending arms 39, each having a radially extending slot 40. In the lower inwardly bent edge flange 41 of the handle 36 there are provided three corresponding slots 40 which are axially aligned with the slots in the arms 39.

Integrally with the valve spindle 34 there are axially staggered holders 42 having radial slots 43 corresponding to the slots 16 shown in FIGS. 1 and 2 and to the slots 40 in the handle 36. Totally, there are three pairs of holders 42 evenly distributed around the axis of spindle 34, i.e. with an angular spacing of 120°, and at the same time staggered in the axial direction along the spindle 34 in accordance with the pitch of the thread 35.

In the axially aligned slots 43 of each pair of holders 42, an internal magnet unit consisting of a circular-cylindrical rod magnet 44 and two pole shoes 45, is rotatably supported by means of axially extending pivot pins 46 integral with the pole shoes 45. The lateral surface of each pole shoe 45 is a surface of revolution coaxial with the rod magnet 44 and having a generatrix corresponding to the profile of the thread 35.

Three corresponding external magnet units each consists of a circular-cylindrical rod magnet 47 made of a permanently magnetic material, and two pole shoes 48. By means of axially projecting pins 49 each of said magnet units is guided with a suitable small play in two axially aligned slots 40 in the handle 36. The pole shoes 48 are generally circular-cylindrical but on part of their surfaces, they are profile-ground as already mentioned above in connection with FIGS. 1 and 2, and with such profile that they may embrace the thread 35 externally with a comparatively large area of contact. Consequently—unlike units 44, 45—the magnet units 47, 48 cannot rotate in their guide slots 40 but can only adjust themselves radially so that, as in the embodiment in FIGS. 1 and 2, there may be established a magnetic circuit between the internal and the external magnet units with small magnetic resistance and losses.

The three arms 39 at the inner side of the handle 36 are, like the corresponding holder arms 42 on the valve spindle 34, staggered axially with respect to each other in accordance with the pitch of the thread 35. Consequently, at three places of the circumference of the valve body there will be an internal and an external magnet unit in close mutual contact so that a rotation of the handle 36 will be transmitted with maximum efficiency to the valve spindle 34 which is consequentially rotated and displaced axially, due to the thread 35, for opening or closing the flow passage by means of the valve member, not shown, dependent on the direction of rotation.

The examples described above serve only to illustrate the principles of the invention which may be realised in several other ways within the scope of the claims. By way of example, the pole shoes of the external magnet units shown in FIG. 3 may be designed as solids of rotation in analogy with the pole shoes shown in FIGS. 1 and 2, whereby also the external magnets are capable of rolling on the wall of the valve body when the control handle is turned. The invention may also be applied to valves wherein the magnets are disposed at the inner side and the outer side, respectively, of a plane wall, for example a solid end wall of a valve body. The valve according to the invention may be used in different fields where it is of importance to attain accurate adjustment and ensure tightness of the valve body, for example as a radiator valve or as a shut-off valve for aggressive gases or liquids, such as kerosene, gasoline and other crude oil products.

What I claim is:

1. A fluid control valve comprising a valve body having a flow passage extending therethrough, a valve member displaceable within said valve body for selectively opening and closing said flow passage, an actuating member located within said valve body and operatively connected to said valve member for displacing said member, a displaceable manoeuvring member on the outer side of said valve body, first magnet means supported by said actuating member second magnet means supported by said manoeuvring member, so said first and second magnet means are located in pairs opposite one another at either side of a wall of said valve body for transmitting movements of said manoeuvring member to said actuating member, wherein at least said first magnet means is supported by said actuating member so as to enable it to perform a rolling movement along said wall of said valve body.

2. A fluid control valve as claimed in claim 1, wherein said wall of said valve body is a surface of rotation, and wherein said first magnet means comprises rod magnets which are supported by the actuating member so as to be rotatable on their longitudinal axes.

3. A fluid control valve as claimed in claim 2, wherein said wall of said valve body is provided with a thread of relatively softly rounded profile shape, and wherein the end portions of said magnet means have a cross-sectional profile adapted to the thread of said valve body.

4. A fluid control valve as claimed in claim 2 wherein the magnet means are substantially circular-cylindrical and provided with pole shoes of greater diameter at their ends.

5. A fluid control valve as claimed in claim 2, wherein said magnets are provided at each end with an axially projecting pin which is guided in a radial slot in a holder secured to at least one of the actuating member and the manoeuvring member.

6. A fluid control valve as claimed in claim 5, wherein the holders secured to the actuating member are shaped as spiders.

7. A fluid control valve as claimed in claim 6, wherein each of said holders is provided with two diametrically opposite slots, and the two corresponding magnets are disposed in the holders with a north pole of one magnet opposite a south pole of the other magnet.

8. A fluid control valve as claimed in claim 3, wherein the magnet means are substantially circular-cylindrical and provided with pole shoes of greater diameter at their ends.

9. A fluid control valve as claimed in claim 3, wherein said magnets are provided at each end with an axially projecting pin which is guided in a radial slot in a holder secured to the actuating member and/or the manoeuvring member.

10. A fluid control valve as claimed in claim 9, wherein the holders secured to the actuating member are shaped as spiders.

References Cited

UNITED STATES PATENTS

| | | | |
|---|---|---|---|
| 2,289,574 | 7/1942 | Carlson | 251—65 |
| 2,346,904 | 4/1944 | Carlson | 251—65 |
| 2,589,188 | 3/1952 | Craene et al. | 251—65 |
| 2,792,194 | 5/1957 | Huck | 251—65 |
| 2,902,221 | 9/1959 | Hajny | 251—129 |
| 3,023,576 | 3/1962 | Musgrave | 251—65 X |

FOREIGN PATENTS

| | | |
|---|---|---|
| 1,200,372 | 6/1959 | France. |
| 1,092,940 | 11/1960 | Germany. |
| 583,755 | 10/1958 | Italy. |

M. CARY NELSON, *Primary Examiner.*

R. C. MILLER, *Assistant Examiner.*